UNITED STATES PATENT OFFICE.

RUFUS G. GISH, OF REDFIELD, KANSAS.

MEDICAL COMPOUND.

SPECIFICATION forming part of Letters Patent No. 333,746, dated January 5, 1886.

Application filed May 2, 1885. Serial No. 164,223. (No specimens.)

*To all whom it may concern:*

Be it known that I, RUFUS G. GISH, of Redfield, in the county of Bourbon and State of Kansas, have invented a new and Improved Medicine for the Treatment of Consumption and Like Diseases, of which the following is a full, clear, and exact description.

The object of my invention is to provide a new and improved medicine for the treatment of consumption and like diseases.

The invention consists of the following ingredients mixed in the following proportions, namely: blood-root, (*Sanguinaria Canadensis,*) one ounce; dandelion-root, (*Taraxacum,*) one ounce; black cohosh-root, (*Cimicifuga,*) one ounce; burdock-root, (*Arctium lappa,*) one ounce; spikenard, (*Aralia nudicaulis,*) one ounce; comfrey, (*Symphytum officinale,*) one ounce; bitter-sweet,(*Solanum dulcamara,*) one ounce; sassafras-bark, (*Laurus sassafras,*) one ounce; water, four gallons; sweet yeast, one pint; loaf sugar, one pound; spirits, one ounce.

The water, blood-root, dandelion-root, black cohosh or cimicifuga root, burdock-root, spikenard, comfrey, bitter-sweet, and sassafras are placed in a suitable vessel and boiled down to one gallon, whereby all the curative, aromatic, and medicinal properties are extracted from the herbs and roots. When the decoction is cool, the sweet yeast and sugar are added and the mixture fermented and filtered through a cloth, and the spirits added to prevent souring.

The dandelion and cimicifuga roots, if used in a dried state, which is the preferable way, are comminuted or powdered; otherwise (in a green state) they are bruised.

The dose is a wine-glassful, to be repeated at intervals of four hours.

Having thus described my invention, I claim as new and desire to secure by Letters Patent—

The herein-described medicine for the treatment of consumption, &c., consisting of blood-root, dandelion, black cohosh, burdock-root, spikenard, comfrey, bitter-sweet, sassafras, water, sweet yeast, loaf sugar, and spirits, about in the quantities given.

RUFUS G. GISH.

Witnesses:
 G. B. CONN,
 J. H. NUMER.